United States Patent [19]
Scourtes et al.

[11] Patent Number: 5,469,741
[45] Date of Patent: Nov. 28, 1995

[54] APPARATUS AND METHODS FOR DETECTING IMBALANCE

[75] Inventors: George Scourtes, Clearwater, Fla.; John P. Gagneur, Westland, Mich.

[73] Assignee: Lucas Automation & Control Engineering, Inc., Reston, Va.

[21] Appl. No.: 79,459

[22] Filed: Jun. 18, 1993

[51] Int. Cl.$^6$ .............................. G01M 7/06; G01M 1/16
[52] U.S. Cl. ........................................... 73/462; 73/117.3
[58] Field of Search ............................ 73/460, 462, 459, 73/116, 117.3, 862.29

[56] References Cited

U.S. PATENT DOCUMENTS

| | | | |
|---|---|---|---|
| 3,121,335 | 2/1964 | Ongaro | 73/460 |
| 3,443,440 | 5/1969 | Porter | 73/462 |
| 3,834,221 | 9/1974 | Swis | 73/459 |
| 3,903,738 | 9/1975 | Malchow | 73/862.29 |
| 4,174,627 | 11/1979 | Swis | 73/116 |
| 4,313,341 | 2/1982 | Yamaguchi et al. | 73/862.29 |

Primary Examiner—Hezron E. Williams
Assistant Examiner—Christine K. Oda
Attorney, Agent, or Firm—Learman & McCulloch

[57] ABSTRACT

An internal combustion engine having a rotary crankshaft and pistons reciprocable in cylinders is tested for imbalance by suspending the engine from above to preclude vertical displacement of the engine and clamping the engine horizontally to preclude horizontal displacement thereof. Force sensors act on the engine to detect both vertical and horizontal forces imposed on the engine in response to rotation of the crankshaft by a crankshaft driver and resulting reciprocation of the pistons at speeds sufficient to cause the imposition of horizontal and vertical forces on the engine by a moving, unbalanced mass. The forces may be measured and oriented to enable the imbalance to be corrected. The cylinders are evacuated during rotation of the crankshaft to avoid the imposition of loads on the moving parts of the engine during the test. Changes in torque due to changes in the speed of rotation of the crankshaft may be detected by load cells which are responsive to rocking movements of the crankshaft driver.

46 Claims, 4 Drawing Sheets

5,469,741

APPARATUS AND METHODS FOR DETECTING IMBALANCE

This invention relates to apparatus and methods for detecting imbalance of an assembled workpiece, such as an internal combustion engine of the kind having a rotary crankshaft and reciprocating pistons.

BACKGROUND OF THE INVENTION

Some manufacturers of automotive internal combustion engines require that each assembled engine be tested dynamically to minimize vibration that may be transmitted from an unbalanced engine to the vehicle in which the engine is installed. Some engine manufacturers balance each individual component prior to its inclusion in the final assembly with other components on the theory that, if each component is balanced, an assembly of such components also will be balanced. All components, however, are manufactured to tolerances. It is possible, therefore, that the tolerances may accumulate in such manner as to produce a condition of imbalance in one or more of the subassemblies, thereby resulting in the generation of unacceptable vibrations even though all of the component parts of the assembly are within the tolerance applicable to each such part.

Other engine manufacturers assemble all of the component parts in the engine and thereafter perform a balance test. This kind of balance testing, without ensuring that all of the components themselves are within tolerance limits, runs the risk of including in an assembled engine grossly imbalanced component parts. This can require an excessive amount of balance correction if an engine is to meet specifications.

The presence of an unbalanced mass in an automotive engine of the kind having a rotary crankshaft and reciprocating pistons normally generates two vibration frequencies. The truly rotary elements, such as the crankshaft and a portion of each connecting rod, as well as the flywheel and the front damper/pulley assembly, generate a first order vibration once during each revolution of the crankshaft. Reciprocating pistons, piston pins, and the remaining portions of the connecting rods generate second order vibrations twice for each revolution. For example, an engine running at a speed of 1200 rpm will generate 20 HZ first order vibrations and 40 HZ second order vibrations if the respective rotary and reciprocating components are not balanced.

The conventional method of measuring engine imbalance is to mount the engine on flexures at both the front and rear of the engine which permit displacement of the engine due to imbalance in each of two horizontal planes perpendicular to the crankshaft. Horizontal velocity or displacement sensors located at each end of the engine measure the horizontal movement created by the forces due to imbalance as the crankshaft rotates. Typically, these sensors measure only first order imbalance forces which are correctable externally of the engine without necessitating disassembly thereof.

Since the conventional balance measuring system referred to above is responsive only to first order horizontal vibrations, it is insensitive to second order vibrations which occur in V-type engines, for example. Consequently, it is not uncommon for the correction of first order imbalance to cause an increase in second order imbalance, thereby resulting in excessive vibrations transmitted through the engine mounts to the vehicle frame. Thus, without measuring both vertical and horizontal vibration components in both the front and rear planes, reciprocating automotive engines cannot always be balanced accurately.

If the workpiece being tested for balance is an internal combustion engine having reciprocating pistons, the movements of the pistons are accompanied by compression and expansion of the gas within the cylinders. The compression of gas imposes loads on the moving parts of the engine, thereby making balance measurements more complex than they would be if no compression loads were present.

SUMMARY OF THE INVENTION

Testing for imbalance of an automotive engine in accordance with the invention is effected by supporting the engine in such manner as to enable the sensing of both horizontal and vertical forces generated by moving, unbalanced masses, restraining the engine against physical displacement by such forces, and measuring the magnitude of the resultant of such forces, thereby enabling both first and second order imbalance force data to be determined so as to permit precise balancing of the engine. In a preferred embodiment of the invention the cylinders of an engine are evacuated during the testing, thereby avoiding the imposition of gas compression loads on the engine.

THE DRAWINGS

Apparatus constructed in accordance with the disclosed embodiment of the invention is disclosed in the accompanying drawings, wherein.

THE PREFERRED EMBODIMENT

Figure 1:
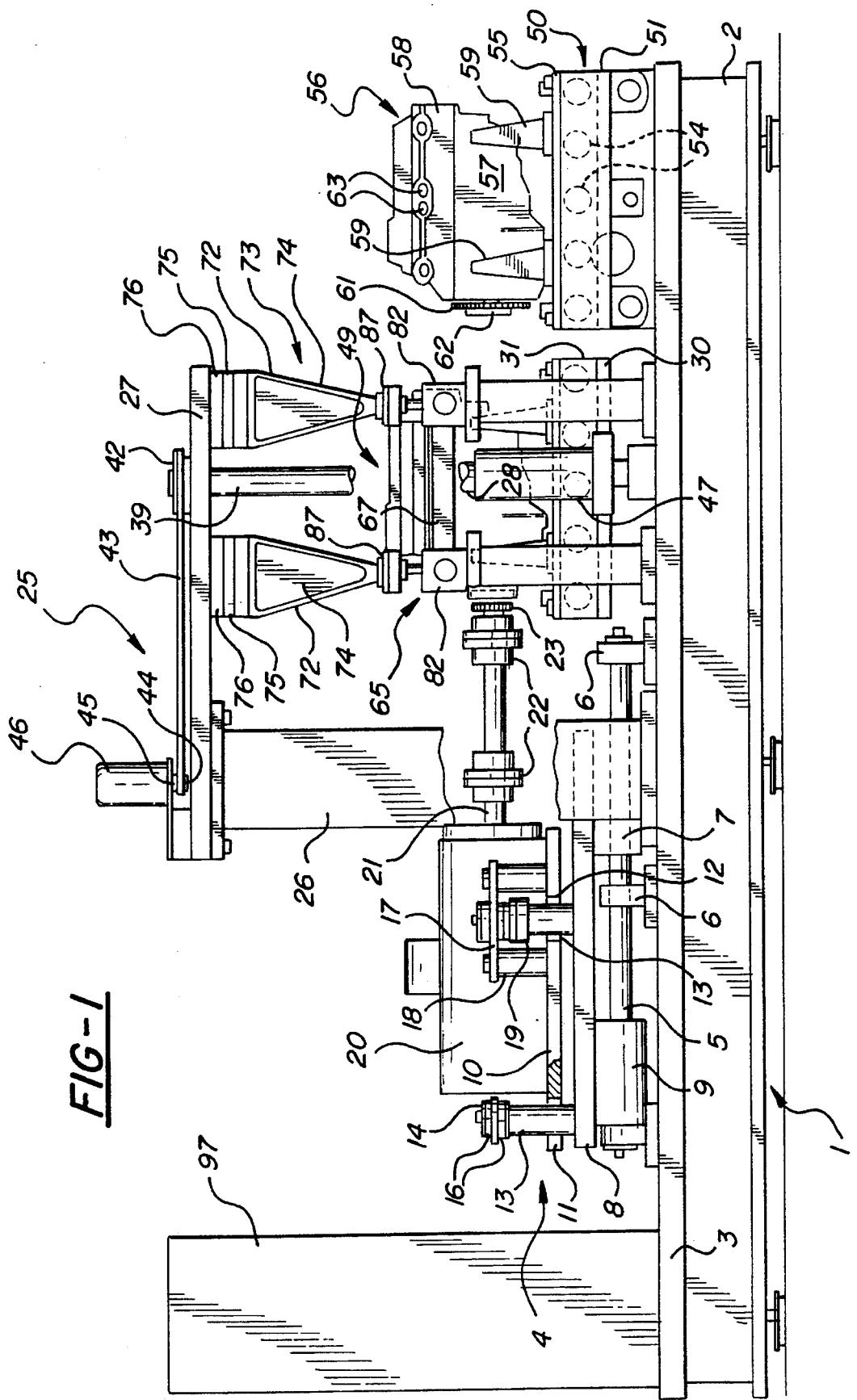
FIG. 1 is a diagrammatic side elevational view of the apparatus at rest with one engine in position to be tested and another engine awaiting its turn to be tested.

Apparatus constructed in accordance with the presently preferred embodiment of the invention comprises a main frame 1 having a base 2 on which is fixed a support 3. A carriage 4 is mounted on the support 3 for reciprocating, horizontal movements by means of threaded rods 5 which extend through support blocks 6. Bushings 7 couple the rods to the lower side of a platform 8 forming part of the carriage 4. The rods 5 are coupled in a conventional manner to a reversible driving motor 9 by means of which the carriage 4 may be reciprocated longitudinally of the support 3.

Supported on the carriage platform 8 is a floating plate 10 having a notch 11 at its rear end and a similar notch 12 at each of its opposite sides. Fixed to the platform 8 and extending upwardly through each of the notches 11 and 12 is a vertical post 13. The upper end of the rear post extends through a rear crossbar 14. The crossbar spans and accommodates a pair of guide posts 15 fixed to and upstanding from the platform 8. The rear crossbar is sandwiched between and clamped in known manner to a pair of deformable rings 16. Each of the posts 13 at opposite sides of the plate 10 carries a crossbar 17 which spans and accommodates a pair of guide posts 18. Each side post 13 is fitted with a pair of deformable rings 16 and a compressible and expansible load cell 19, such as the Lebow Model 3174-5K load cell manufactured by Eaton Corporation, Troy, Mi. The openings in the crossbars 14 and 17 through which the respective posts 13, 15, and 18 extend are oversized with respect to the posts enabling the floating plate 10 to rock about an axis A passing transversely through the rear post 13 to enable the load cells 19 at opposite sides of the plate alternately to be compressed and expanded. The compressible rings 16 at the opposite sides of the plate 10 resist rocking of the latter and restore the plate to a horizontal position after rocking forces are removed.

Fixed to the floating plate 10 is a reversible, electric drive motor 20 having an armature shaft 21 connected through constant velocity coupling assemblies 22 of known construction to a pinion 23. The axes of the shaft 21, the coupling assemblies 22, the pinion 23, and the pivotal coupling of the plate 10 to the rear post 13 are coincident and indicated by the reference character A.

The construction and arrangement of the carriage 4 and its associated parts are such that the carriage and all of the parts connected thereto, including the pinion 23, are reciprocable relative to the main frame 1 under the control of the driving motor 9.

Fixed to the support 3 approximately midway between its ends is an inverted, U-shaped frame 25 comprising a pair of spaced apart, parallel, upright supports 26 joined at their upper ends by an overhead plate or canopy 27 which extends forwardly well beyond the pinion 23. Adjacent the forward end of the canopy 27 is a pair of uprights 28 which extend between the canopy 27 and the support 3 and provide adequate support for the canopy 27 and those parts yet to be described and supported thereby.

Figure 4:
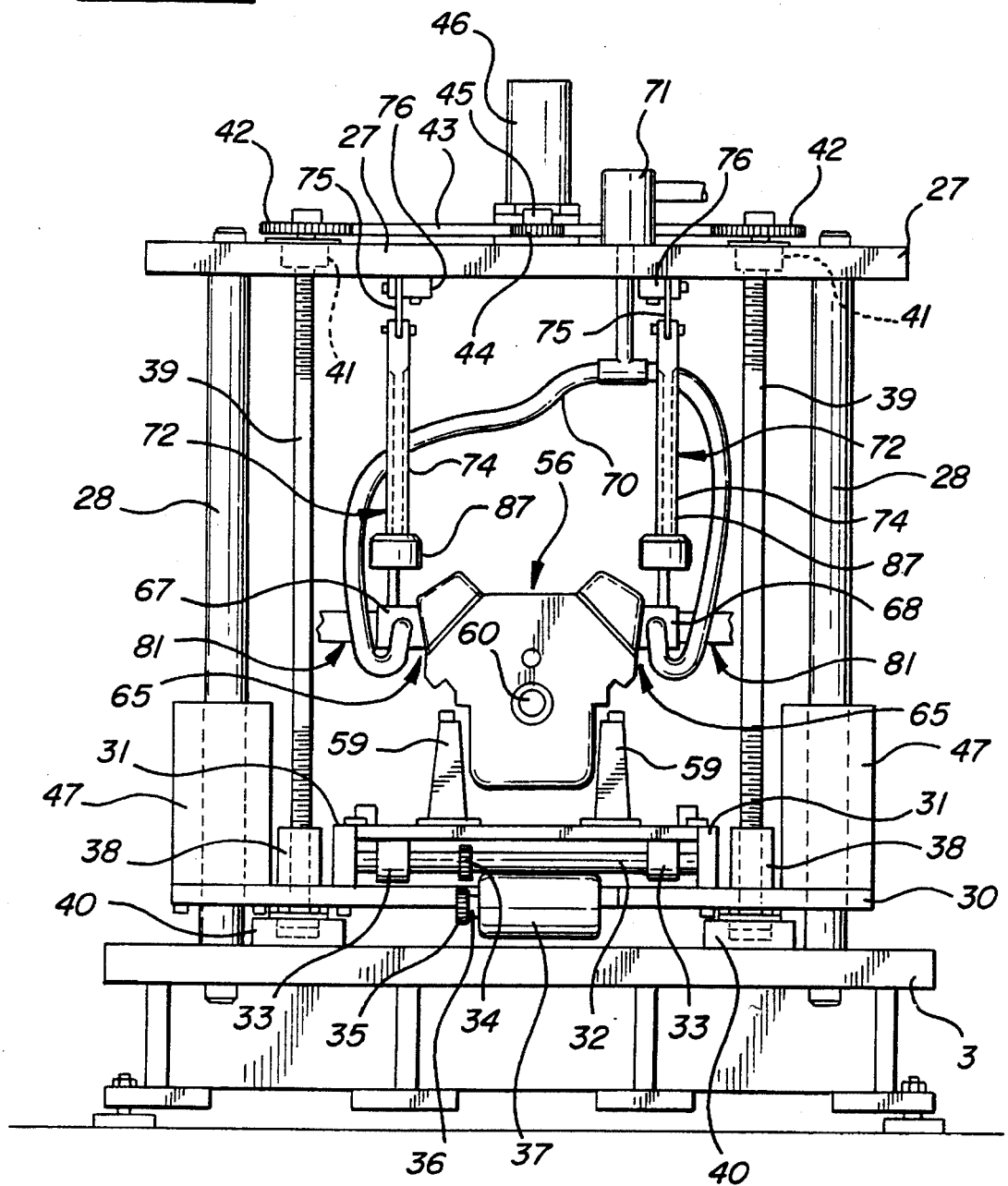
FIG. 4 is a view similar to FIG. 3, but showing certain of the parts in adjusted positions.

Forwardly of the carriage 4 is a vertically adjustable platform 30 on which is mounted a pair of spaced, parallel frame members 31 defining a channel that is spanned by a plurality of driven shafts 32 on each of which is secured a roller 33. Each of the shafts 32 has a sprocket wheel 34 (FIG. 4) thereon and around which a chain (not shown) is trained. Such chain also is trained around a sprocket wheel 35 mounted at the free end of the armature shaft 36 of an electric motor 37. The motor is reversible so as simultaneously to drive the several shafts 32 and their rollers 33 in either of two opposite directions.

Figure 2:
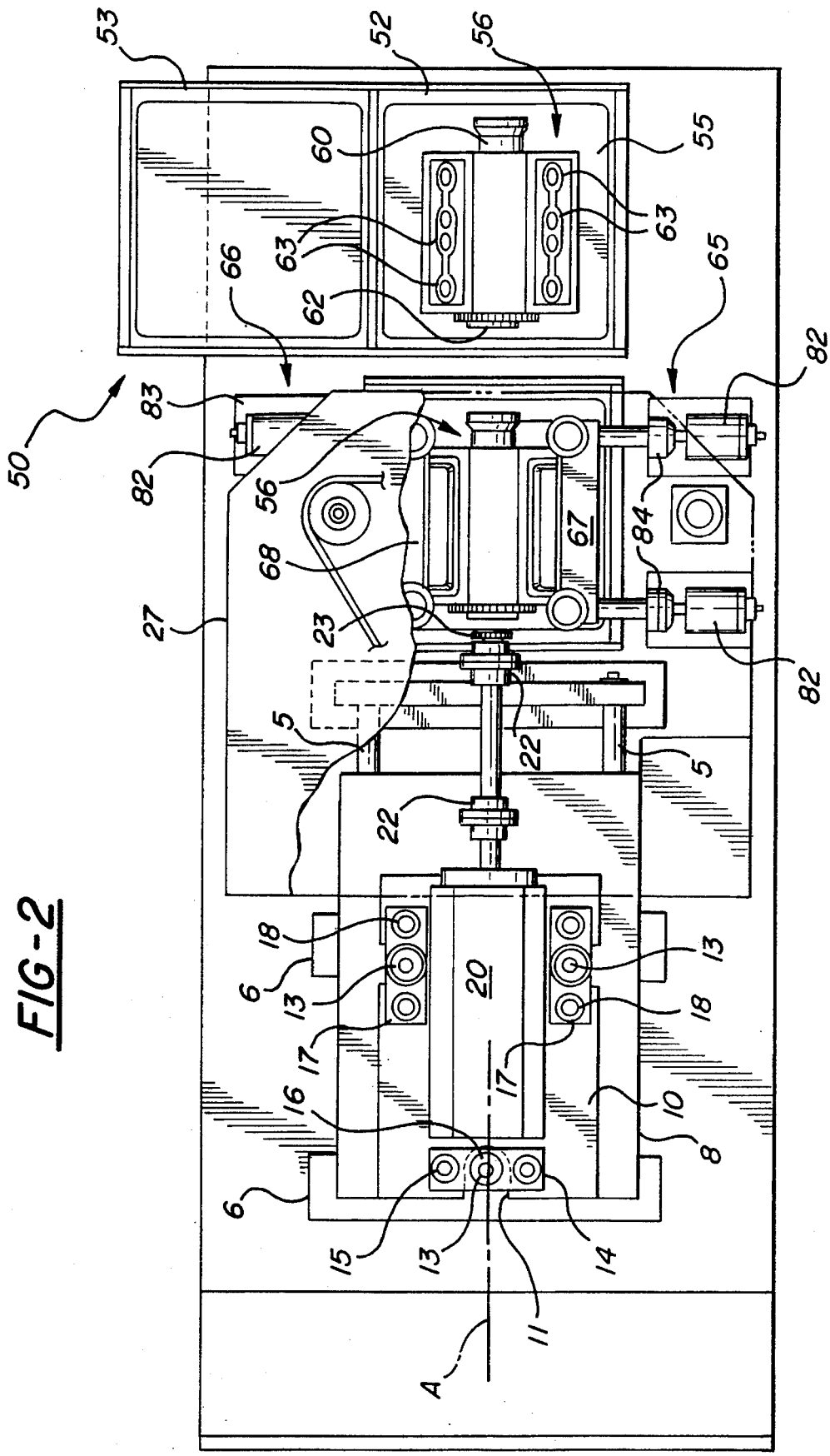
FIG. 2 is a diagrammatic top plan view of the apparatus shown in FIG. 1 with parts broken away and other parts omitted for clarity.
Figure 3:
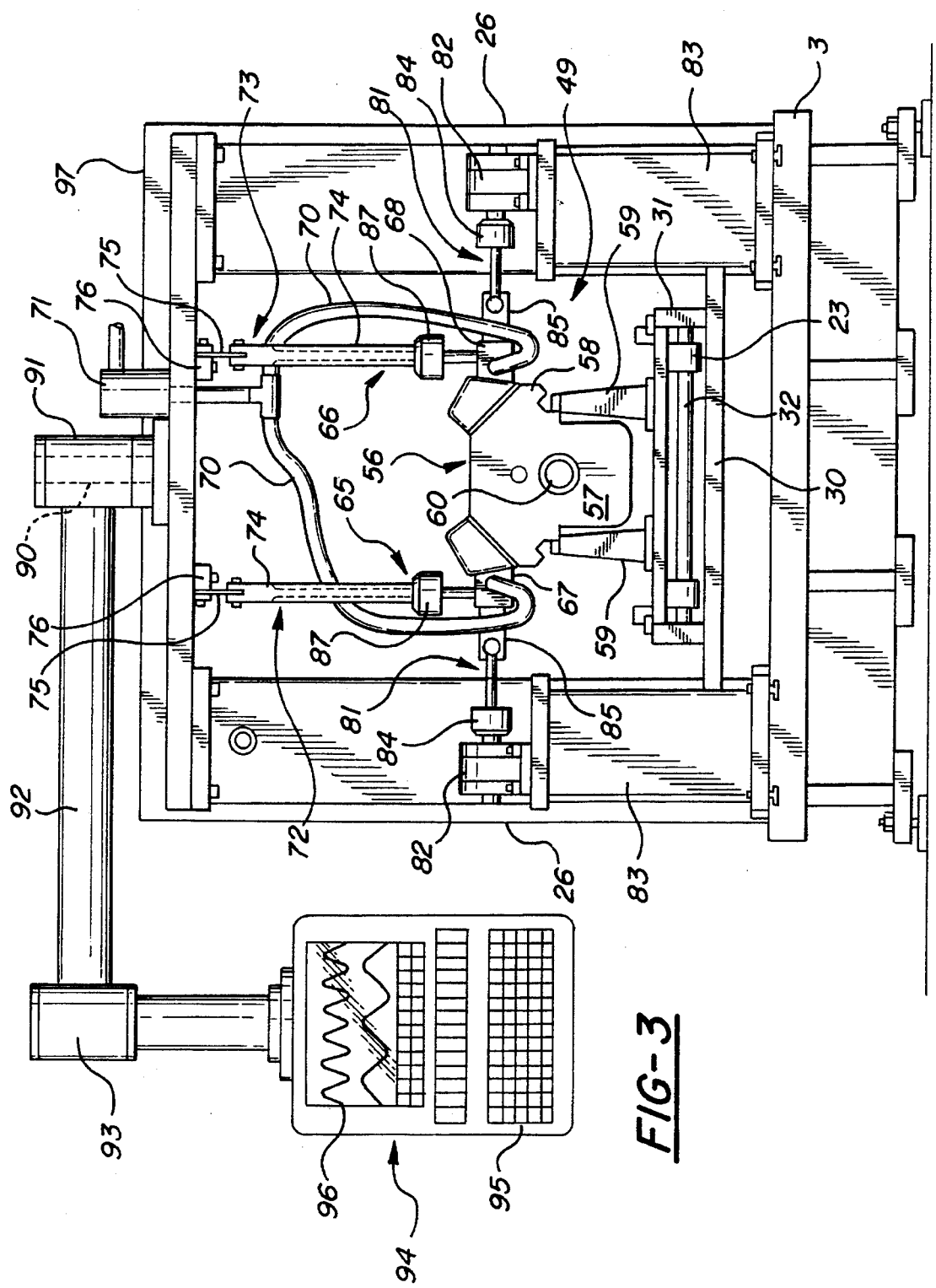
FIG. 3 is an elevational view, with some parts omitted for clarity, of the right-hand end of the apparatus.

Secured to the platform 30 is a pair of tubular, internally threaded nuts 38 through which extend externally threaded adjusting screws 39. The lower ends of the screws 39 are journalled in blocks 40 mounted atop the support 3 and the upper ends of the screws are journalled in bearings 41 carried by the canopy 27. At the upper, free end of each screw 39 is secured a sprocket wheel 42 around which is trained a sprocket chain 43 (only partially shown in FIGS. 2 and 4). The chain also is in driving engagement with a pinion 44 fixed to the armature shaft 45 of an electric motor 46 that is supported atop the canopy 27. The motor 46 is reversible so that rotation of the motor in one direction causes rotation of the screws 39 in a direction to cause the platform 30 to be raised, whereas rotation of the motor 46 in the opposite direction causes the platform 30 to be lowered. Guide bushings 47 mounted on the platform 30 accommodate the support rods 28 to ensure smooth vertical movements of the platform 30 and the parts supported thereon.

The area of the apparatus above the platform 30 and forward of the carriage 4 is designated the workpiece test station 49.

At the forward end of the frame 1 is mounted a reciprocable carriage 50 of the kind disclosed in U.S. Pat. No. 4,144,960, the pertinent disclosure of which is incorporated herein by reference. Briefly, however, the carriage 50 has a frame 51 defining two workpiece supporting stations 52 and 53 each of which has a plurality of reversible, powered rollers 54 upon which a flat bottom pallet 55 may rest. The carriage 50 is reciprocable between two positions in one of which the station 52 is in alignment with the test station 49 and in the other of which the station 53 is in alignment with the test station 30. Each station 52, 53 is adapted to support one of the pallets 55 and each pallet is adapted to support a workpiece 56 which, in the disclosed embodiment, is an automotive engine. The disclosed engine is of the V-type having a centrally located crankcase 57 and two upwardly and outwardly diverging cylinder blocks 58. Each pallet has fixed thereto four upstanding support members 59 which normally engage and removably support the engine.

Each engine has a rotary crankshaft 60 that is fixed at one end to a flywheel 61. Each flywheel is fitted with a toothed coupling 62. As is conventional, the crankshaft 60 is coupled to connecting rods and reciprocable pistons, all of which move in response to rotation of the crankshaft. In the disclosed embodiment each cylinder block has four exhaust ports 63.

The level of each pallet 55 in the workpiece supporting stations 52 and 53 corresponds to the normal pallet level in the test station 49. The normal level of the pallet in the test station 49 is such that, when an engine is supported on the pallet in the test station, the axis of rotation of the engine crankshaft 60 is coincident with the axis A.

In the operation of the apparatus thus far described, a pallet 55 supporting an engine 56 may be moved via the powered rollers 54 and 32 from the station 52 into the test station 49. As the engine moves into the test station, the pallet is guided by suitable, conventional guides to a position in which the coupling 62 is in a position to accommodate the driving pinion 23. Suitable, conventional stops may be operated in known manner to fix the pallet and the engine supported thereby in such position in the test station. Thereafter, the drive motor 9 may be energized to advance the carriage 4 to a position in which the driving pinion 23 is accommodated in the coupling 62, whereupon the motor 9 is deenergized. When the pinion 23 is accommodated in the coupling 62, energization of the motor 20 will effect rotation of the crankshaft of the engine 56 and movement of the parts coupled thereto. Since not only the pinion 23, the coupling 62, and the crankshaft 60 are coaxial, but also the armature shaft of the drive motor 20 and the constant velocity coupling assembly 22, no transverse loads are imposed on the engine by the engine crankshaft driving mechanism.

It is not desired that the engine 56 in the test station be supported by its pallet supports 59 during testing of the engine. Instead, it is preferred that the engine be supported independently of its pallet during testing of the engine for imbalance. To accomplish this objective the apparatus includes a pair of workpiece clamp assemblies 65 at one side of the test station and a similar pair of clamp assemblies 66 at the opposite side of the test station. Each of the clamps of the pair 65 is fixed to a manifold 67 having a surface confronting the engine and configured to complement the shape of that part of the engine that the manifold engages so as to provide vertical support for the engine. Each of the clamps of the pair 66 is fixed to a like manifold 68.

Each of the manifolds 67, 68 is of such length as to span all of the engine exhaust ports 63 at the associated side of the engine and that surface of each manifold which confronts the engine is provided with seals encircling each exhaust port to provide a gas-tight connection between each manifold and the engine surface on which it seats. At either or both ends of each manifold is a port that is coupled by a flexible conduit 70 (FIG. 4) to a vacuum pump 71 mounted atop the canopy 27. Energization of the vacuum pump when the manifolds 67, 68 are clamped against the engine evacuates the cylinders of the engine.

Suspended from the canopy 27 are two pairs of spaced apart vertical supports 72 and 73. Each such support includes a triangularly shaped suspension arm 74 fixed at its upper end to a spring steel or other suitable springy blade 75 which, in turn, is secured to a clamp 76 fixed to the canopy 27. The blades 75 are of such resilience as to enable the lower ends of the arms 74 to swing toward and away from one another, but the blades are sufficiently stiff as to offer substantial resistance to upward vertical movement of the arms 74. The blades also are sufficiently strong to support the weight of the engine.

Clamp operating means 81 is provided for effecting swinging movements of the lower ends of the arms 74 on opposite sides of the engine toward and away from one another and comprises, for each arm, a hydraulic ram 82 mounted atop a support 83. Each ram 82 is connected to the associated clamp assembly 65, 66 via a sensor or load cell 84 like that described earlier and a coupling 85. Each ram is extensible and retractable horizontally in a conventional manner by operation of a conventional hydraulic circuit (not shown).

Fixed to the lower end of each suspension arm 74 and to its associated clamp assembly is a load cell or force sensor 87 like those referred to earlier. The load cells 84 and 87 thus constitute integral parts of the engine suspension and clamping apparatus.

Mounted atop the canopy 27 is a spindle 90 on which is journalled a hub 91. One end of a boom 92 is secured to the hub and the opposite end of the boom is secured to a coupling 93 from which is suspended a data processing unit 94, such as an Intel 80486-33 PC, having a keyboard 95 and a monitor 96. The data processing unit 94 is connected by suitable wiring (not shown) to a control console 97 mounted at one end of the frame 1. Suitable connections (not shown) extend from the console in known manner to the various operating motors, rams, and controls of the apparatus.

To condition the apparatus for operation, an untested engine 56 supported on a pallet 55 is moved into the test station 49 in the manner described earlier and the crankshaft of the engine coupled to the driving pinion 23. Following coupling of the driving pinion to the engine crankshaft, the hydraulic rams 82 are actuated in such directions as to cause the two pairs of clamp assemblies 65 and 66 to move the respective manifolds 67 and 68 toward and into clamping engagement with the engine. Movement of the manifolds toward the engine is facilitated by the flexibility of the spring blades 75. The force exerted by the rams 82 on the manifolds is sufficient to effect rigid clamping of the engine at both of its ends between opposing manifolds and to effect a gas-tight seal between the manifolds and the engine.

As the manifolds move toward and into clamping engagement with the engine 56, the load cells 84 will be stressed. Preferably, the engine is clamped between the opposing manifolds not only under sufficient force to provide support for the engine, but also to preclude virtually any displacement of the engine in a horizontal plane. The rams 82 and the associated manifolds thus not only provide support for the engine, but also restrain the latter against virtually any movement in a horizontal plane. The forces exerted by the rams on the opposing load cells 84 may be indicated by the data processing unit 94.

Following clamping of the engine between the two manifolds, the motor 46 may be energized in such direction as to cause the platform 30, the pallet 55, and the engine supports 59 to lower, thereby disengaging the engine from the supports 59 and suspending the engine from the overhead canopy. The weight of the engine will stress the load cells 87 and the extent of such stress may be detected by the data processing unit 94. The rigidity of the suspension arms 74 and the vertical rigidity of the spring blades 75, together with the weight of the engine 56, preclude virtually any displacement of the engine in a vertical plane. The engine thus is restrained against both vertical and horizontal displacement.

Following clamping of the engine and lowering of the platform 30, the engine will be supported solely by the manifolds 67 and 68 in a test position. In this position the motor 20 may be energized to effect rotation of the engine crankshaft and reciprocation of the pistons.

At or before the commencement of rotation of the engine crankshaft the vacuum pump 71 is actuated to extract air from the cylinders of the engine. This enables the crankshaft to be rotated without the imposition of any load on the moving parts of the engine due to the compression of air in the cylinders.

An important characteristic of the invention is that the axes of the driving motor 20, the engine crankshaft 60, the constant velocity coupling 22, and the pinion 23 are coincident. Thus, no lateral thrust is imposed on the engine crankshaft by the driving mechanism, thereby avoiding the generation of false imbalance signals.

The engine under test is suspended from above by four pairs of horizontal and vertical load cells, two pairs of which are at one end of the engine and the other two pairs of which are at the opposite end of the engine. The load cells of each pair are so arranged as to have bi-axial sensitivity to displacement of the engine. That is, the two load cells of each pair are operable to measure force in horizontal and vertical planes. Thus, rotation of the engine crankshaft enables moving, unbalanced masses to exert forces on the engine tending to displace it from the test position. Since the engine under test acts directly on the load cells and is virtually incapable of movement, the load cells can detect and measure both first and second order imbalance forces in all planes and in all axes, thereby permitting a very precise engine balance test to be accomplished.

In analyzing the data produced by the load cells, the vertical and horizontal signals generated at each end of the engine are summed together to provide one vertical and one horizontal signal from one end of the engine and one vertical and one horizontal signal from the opposite end of the engine. The clamping forces applied to the horizontal axis load cells cancel one another so that only the differential or imbalance force remains. The weight of the engine applied to the vertical axis load cells is suppressed electrically in known manner so that, again, only the imbalance force remains.

The force balance measurement process comprises rotating the engine crankshaft at a predetermined speed sufficient to generate forces due to a moving, unbalanced mass. The speed may range from, say, 500–1500 rpm. During rotation of the crankshaft the output signals from the load cells are monitored. The signals may be analyzed and processed by the computer 94 wherein they are amplified and fed to an analog/digital converter for digitizing. The analysis may conform, for example, to that formulated by Fourier as described on pages 22–25 of the 1987 revised edition of *Mechanical Vibration and Shock Measurement* published by Professor Jens Trampe. Extraneous noise and other signals irrelevant to balance data are filtered out using conventional software filters. The resultant signals from each plane and axis represent pure imbalance forces generated by non-symmetrical masses rotating and reciprocating about the axis of the crankshaft. A precision encoder, coupled to the crankshaft, may be used in a conventional manner to indicate the position of any unbalanced mass.

It is not necessary that four pairs of load cells be used. It is possible to use one pair of horizontal and vertical axis load cells at one end of the engine and a second pair of horizontal and vertical pair load cells at the opposite end of the engine. This arrangement reduces the number of load cells from eight to four. It also is possible to use only one pair of horizontal and vertical axis load cells in which event the load cells may be mounted at one end or at the center of the engine. The test results will not be as good as those obtained from the use of two or four pairs of load cells, but such results may be adequate for some purposes.

If it is desired to do so, the apparatus may be used not only to detect imbalance, but also to measure changes in torque produced in response to changes in the speed of rotation of the engine crankshaft and resulting rocking of the motor 20 about the axis A. Torque change can be detected by the two load cells 19 at opposite sides of the motor 20 which are responsive both to compressive and tensile forces. The outputs from the load cells 19 are connected and processed in known manner through the computer 94 for display by the monitor 96.

When all tests have been completed on a workpiece, the platform 30 may be raised to enable the pallet supports 59 to reengage the tested engine, following which the rams 82 may be retracted to release the engine. The tested engine then may be withdrawn from the test station 49 and another, untested engine delivered to the test station for testing.

Restraining the engine against virtually any movement during the imbalance testing procedure has a significant advantage over known engine imbalance testing methods which rely upon significant engine displacement to detect and measure imbalance. In those instances in which an engine is permitted to partake of appreciable movement in response to the generation of an imbalance force, a significant part of that force is damped by the mass of the engine. In the testing method according to the invention, however, immobilizing the engine and evacuating the cylinders enable virtually the entire imbalance force to be measured and oriented with respect to its axis of thrust. Consequently, imbalance testing according to the invention enables superior balancing to be achieved.

The disclosed embodiment is representative of a presently preferred form of the invention, but is intended to be illustrative rather than definitive thereof. The invention is defined in the claims.

We claim:

1. Apparatus for testing for imbalance a workpiece having at least one rotatable element, said apparatus comprising means for positioning said workpiece in a test position; means for rotating said element while said workpiece is in said station and at a speed sufficient to cause a moving, unbalanced mass to exert a force on said workpiece tending to move said workpiece relative to said position; restraining means acting on said workpiece during rotation of said element for preventing virtually any movement thereof in all directions from said position; and force sensing means acting on said workpiece for sensing force applied on said workpiece by said moving unbalanced mass.

2. Apparatus according to claim 1 wherein said restraining means comprises means for suspending said workpiece from above.

3. Apparatus according to claim 1 wherein said restraining means comprises clamp means movable into and out of engagement with said workpiece along a substantially horizontal path.

4. Apparatus according to claim 1 wherein said restraining means comprises means for suspending said workpiece from above and clamp means movable into and out of engagement with said workpiece along a substantially horizontal path.

5. Apparatus according to claim 4 wherein the means for suspending said workpiece from above is relatively flexible in a horizontal plane and relatively inflexible in a vertical plane.

6. Apparatus according to claim 1 wherein said workpiece has opposite ends and wherein said restraining means comprises suspension means for connection to each end of such workpiece and clamping means for engagement with each end of said workpiece.

7. Apparatus according to claim 6 wherein said suspension means is operable to support said workpiece from above and said clamping means is operable to engage said workpiece on opposite sides thereof.

8. Apparatus according to claim 1 wherein said force sensing means comprises load cells.

9. Apparatus according to claim 1 wherein said restraining means is constituted in part by said force measuring means.

10. Apparatus according to claim 1 wherein said force sensing means includes analyzing means and means for transmitting forces sensed by said sensing means to said analyzing means to measure said force.

11. Apparatus according to claim 1 wherein said workpiece comprises an internal combustion engine having a rotary crankshaft and at least one piston reciprocable in a cylinder.

12. Apparatus according to claim 11 including means for evacuating said cylinder.

13. Apparatus according to claim 12 wherein said evacuating means includes a suction pump in communication with said cylinder.

14. Apparatus according to claim 1 including means for detecting torque and changes in torque generated in response to rotation and changes in the speed of rotation of said element.

15. Apparatus according to claim 14 wherein said detecting means comprises at least one load cell.

16. Apparatus for testing for imbalance a workpiece having a rotatable shaft and at least one part coupled to said shaft for reciprocable movement in response to rotation of said shaft, said apparatus comprising frame means defining a test station; means for supporting said workpiece in a test position in said station; means for rotating said shaft when said workpiece is in said position and at such speed as to enable a moving, unbalanced mass to exert a force on said workpiece tending to displace said workpiece from said position; restraining means engageable with said workpiece for preventing virtually any displacement of said workpiece from said position; and force sensing means for sensing the force applied on said workpiece by said moving, unbalanced mass tending to move said workpiece from said position.

17. Apparatus according to claim 16 wherein said supporting means comprises means for suspending said workpiece vertically from above.

18. Apparatus according to claim 16 wherein said supporting means comprises clamp means for exerting horizontal clamping force on said workpiece.

19. Apparatus according to claim 16 wherein said supporting means comprises means for suspending said workpiece vertically from above and clamp means for exerting horizontal clamping force on said workpiece.

20. Apparatus according to claim 16 wherein said force sensing means comprises a plurality of electrical load cells.

21. Apparatus according to claim 20 wherein said load cells are arranged to sense both vertical and horizontal forces applied on said workpiece by said moving unbalanced mass.

22. Apparatus according to claim 16 wherein said workpiece comprises an internal combustion engine having a rotary crankshaft and at least one piston reciprocable in a cylinder.

23. Apparatus according to claim 22 including means for evacuating said cylinder.

24. Apparatus according to claim 23 wherein said restraining means comprises a manifold in communication with said cylinder and wherein said evacuating means includes a suction pump in communication with said manifold.

25. Apparatus according to claim 16 including means for detecting torque and changes in torque generated in response to rotation and changes in the speed of rotation of said element.

26. Apparatus according to claim 25 wherein said detecting means comprises at least one load cell.

27. Apparatus for testing for imbalance a workpiece having at least one rotary element, said apparatus comprising frame means defining a test station; a workpiece support; means for moving said workpiece support and a workpiece supported thereon into said test station; suspension means carried by said frame means for suspending said workpiece in said test station from above to define a test position for said workpiece; means for separating said workpiece and said workpiece support while said workpiece is suspended in said test position; means for rotating said rotary element while said workpiece is in said test position; restraining means carried by said frame means and engageable with said workpiece while the latter is in said test position for preventing virtually any movement of said workpiece relative to said frame means from said test position; and force sensing means for sensing force exerted on said workpiece by an unbalanced mass which is movable in response to rotation of said rotary element.

28. Apparatus according to claim 27 wherein said force sensing means constitute integral parts of said suspension means and said restraining means.

29. Apparatus according to claim 27 wherein the means for separating said workpiece and said workpiece support comprises a platform on which said workpiece is supported, and means for moving said platform vertically.

30. Apparatus according to claim 27 including means for measuring torque and changes in torque generated on said workpiece by rotation and changes in the speed of rotation of said rotary element.

31. A method of testing for imbalance a workpiece having at least one rotary element, said method comprising clamping said workpiece in a test position under sufficient force to restrain virtually any movement of said workpiece from said position; rotating said element at a speed sufficient to cause an unbalanced, moving mass to exert a force on said workpiece tending to move said workpiece from said position; and measuring said force.

32. The method according to claim 31 wherein said force has a component exerted in a horizontal plane, said method including measuring the horizontal component of said force.

33. The method according to claim 31 wherein said force has a component exerted in a vertical plane, said method including measuring the vertical component of said force.

34. The method according to claim 31 wherein said force has a component exerted in a horizontal plane and a component exerted in a vertical plane, said method including measuring both of said horizontal and vertical components of said force.

35. The method according to claim 34 including determining the resultant of said horizontal and vertical components of said force.

36. A method of testing for imbalance a workpiece having at least one rotary element, said method comprising immobilizing said workpiece in a test position from which said workpiece is virtually incapable of movement in either a horizontal or vertical plane; rotating said element at such speed as to cause a moving, unbalanced mass to exert a force on said workpiece tending to move said workpiece from said test position; and measuring the force exerted on said workpiece by said moving, unbalanced mass.

37. The method according to claim 36 wherein said force has a component exerted in a horizontal plane, said method including measuring the horizontal component of said force.

38. The method according to claim 36 wherein said force has a component exerted in a vertical plane, said method including measuring the vertical component of said force.

39. The method according to claim 36 wherein said force has a component exerted in a horizontal plane and a component exerted in a vertical plane, said method including measuring both of said horizontal and vertical components of said force.

40. The method according to claim 39 including determining the resultant of said horizontal and vertical components of said force.

41. The method according to claim 36 wherein rotation of said element effects reciprocation of a reciprocable part of said workpiece that is coupled to said element.

42. A method of testing for imbalance a workpiece having rotary and reciprocable elements, said method comprising suspending said workpiece from an overhead support by vertically rigid supporting means so that said workpiece occupies a test position from which said workpiece is virtually immovable in a vertical plane; applying horizontal clamping forces on said workpiece while said workpiece is in said test position and of such magnitude as virtually to preclude movement of said workpiece in a horizontal plane from said test portion; rotating and reciprocating the rotary and reciprocable elements of said workpiece at such speed as to cause an unbalanced mass to exert a force on said workpiece tending to move said workpiece from said test position; and measuring said force.

43. The method according to claim 42 wherein said force has a vertical component and a horizontal component, and wherein the measurement of said force includes both of said components.

44. The method according to claim 42 wherein said force has a vertical component and a horizontal component, and wherein the measurement of said force includes measuring the resultant of said vertical and horizontal components.

45. A method of testing for imbalance an internal combustion engine having a rotary crankshaft and at least one piston coupled to said crankshaft for reciprocation in a cylinder, said method comprising immobilizing said engine in a test position from which said engine is virtually incapable of any movement; rotating said crankshaft while said engine is in said test position and at such speed as to cause an unbalanced, moving mass to exert a force on said engine tending to displace said engine from said test position; evacuating said cylinder while rotating said crankshaft; and measuring said force.

46. The method according to claim 45 including measuring changes in torque generated by said engine in response to rotation and changes in speed of rotation of said crankshaft.

* * * * *